Oct. 5, 1937.  H. G. REICHERT ET AL  2,094,619
LIGHTER-THAN-AIR AIRCRAFT
Filed March 5, 1935  3 Sheets-Sheet 3

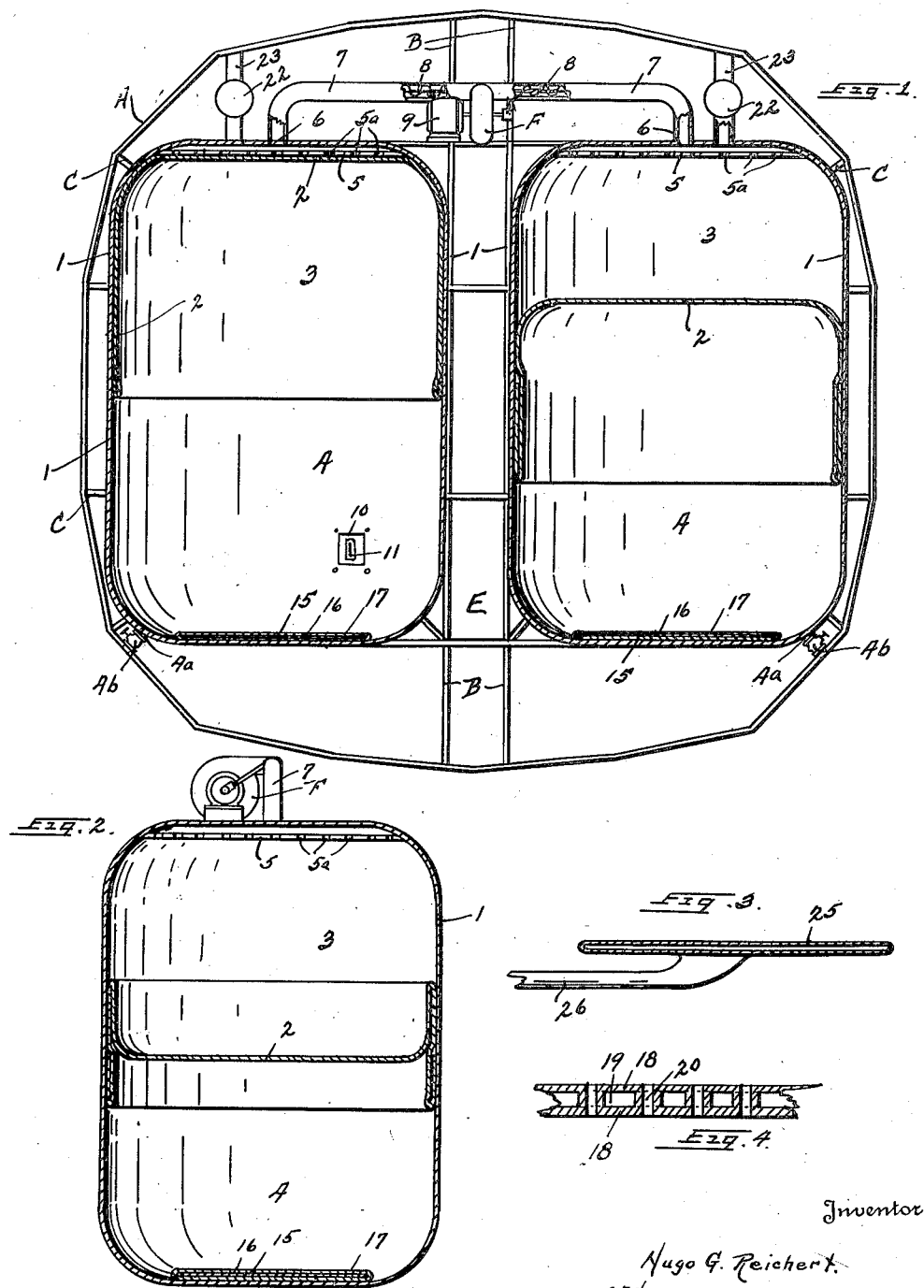

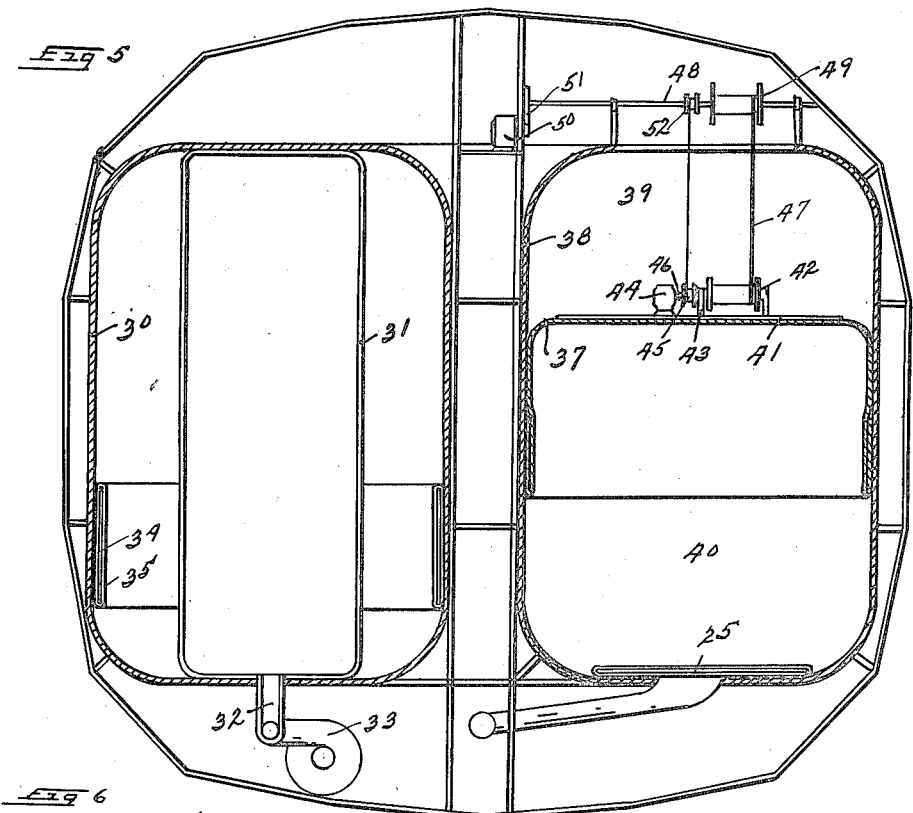
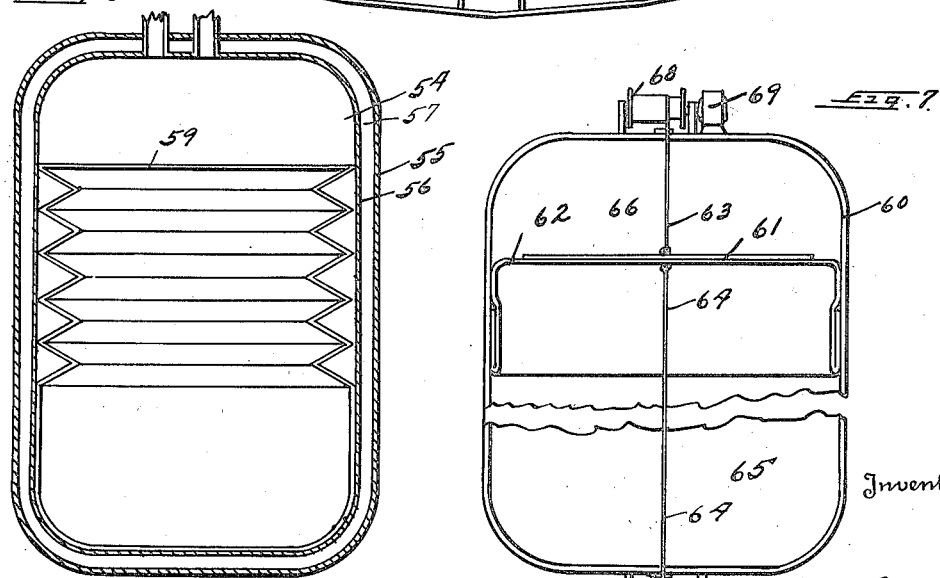

Inventor
Hugo G. Reichert
and Ludwig H. O. Stobbe
By R. M. Thomas
Attorney

Patented Oct. 5, 1937

2,094,619

UNITED STATES PATENT OFFICE 2,094,619

LIGHTER-THAN-AIR AIRCRAFT

Hugo G. Reichert and Ludwig H. O. Stobbe, Salt Lake City, Utah

Application March 5, 1935, Serial No. 9,367

3 Claims. (Cl. 244—97)

Our invention relates to lighter than air aircraft, and has for its object to provide a new and efficient gas cell and control means therefor, which will provide a positive means of controlling the aircraft.

A further object is to provide a gas cell for air ships which will be controlled by internally situated thermostats to control the temperature of the gas and which cells will be divided by a flexible diaphragm with the gas held on one side of the diaphragm and the air on the other side, the gas pressure and air pressure being equalized at all times.

The express purpose is to provide an air craft in which it is possible to raise and lower the air ship vertically under definite control as well as facilitating in propelling the ship at the same time increasing the efficiency and the adaptability of air transportation.

A further object is to provide an aircraft which will have the danger eliminated therefrom due to the control thereof and which will adapt the present aircraft when equipped with this invention, to broader fields of activity.

A still further object of this invention is to decrease the costs of this type of air transportation by requiring less helium lifting gas for navigation, by eliminating the waste and diffusion of the gas by increasing the lifting capacity of the helium gas per cubic foot through controlled temperature changes, and by eliminating waste of the gas by valving during flight, or landings.

This present invention also eliminates the overhead pressure system and makes it unnecessary to use the water recovery system for altitude control now used on lighter than air crafts. This invention further decreases the amount of gasoline required for navigation, and does away with the downward thrust of the propeller in maintaining altitude and in landing.

A still further object is to provide a lighter than air aircraft which can fly at any altitude whether carrying full capacity load or empty, and at the same time have full lifting capacity at all times through temperature and pressure control of the gas. This also allows the pick up and discharge of cargo en route, without changing the amount of helium gas and maintaining full lifting capacity at all times.

The present invention will also allow for landing at any place desired without ground crew of so many men and without a mooring mast being necessary, and further, allows the craft to take off as, and when, desired. This invention also allows for increasing speed enroute whether cargo or passengers are being carried, and for less accidents to cargo and passengers, and making lower rates possible for this type of transportation. Further, this type of ship so completely controlled may be used in a new way with cheapest transportation possible by gaining the altitude in which the air currents are traveling in the direction of transportation and the transportation then entirely taken over by the air currents. The motors may be shut off and the air currents will carry the aircraft to the desired landing field at which time the controls are worked by the navigator and the ship lowered to the ground. Thus, the fuel may be saved and the air currents utilized.

A still further object of the present invention is to lengthen the scope of travel of this type of aircraft, lowering the costs for long cargo or passenger flights, and allowing for intercontinental traffic and transoceanic flights with the greatest degree of safety.

Inasmuch as the water recovery system is eliminated in this type of aircraft through this invention, the power of the lifting gas formerly used for carrying the liquid exhaust, can be used for transporting pay cargo and at intermediate stops enroute more cargo may be taken on because the exhaust is liberated into the atmosphere eliminating the formerly dead weight of the water recovery system and the liquid recovered.

The specifically special principle involved for the raising and lowering and propelling of the aircraft, in this invention and which are basically essential to this invention are, chiefly those of compression and expansion of definite volumes of gases under definite pressures and under definite temperature control of these gases.

In the drawings

Figure 1 is a vertical section of a lighter than air aircraft, showing two of our cells sectioned.

Figure 2 is a vertical section of one cell with the gas in the cell in the act of being compressed by the air pressure.

Figure 3 is a section of one of the heating elements used when hot air or exhaust gases are used to heat the helium gas in the cells.

Figure 4 is a section of a refrigerating perforated floor to be used at the top of the cells if desired.

Figure 8:
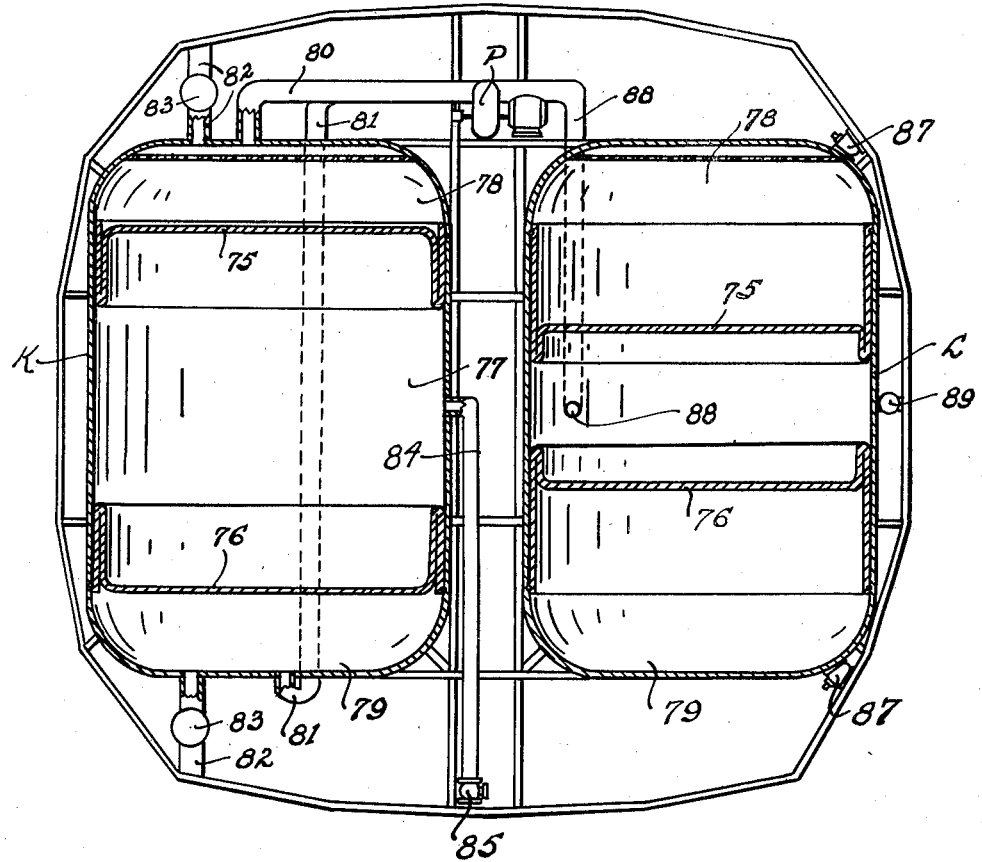

Figure 5 is a vertical transverse section of an aircraft having one side provided with one of our cells showing a mechanical element for compressing and allowing the gas to expand. The other side of the section shows one of the cells modified with an expanding air cell within the gas cell to use air pressure in an expanding and contracting flexible bag within the gas cell by which the gas is controlled.

Figure 6 is a vertical section of a modified form of gas bag within the cell showing a bellows type of gas bag.

Fig. 7 is a vertical section of one cell showing a mechanical way of compressing or allowing the gas to expand.

Figure 8 is a sectional view of a modified form of the device in which double diaphragms are used to control the gas pressure.

In the drawings we have shown the outer frame work and hull of the aircraft as A, having the usual ribs, and rings for proper support therefor and keep it in its proper position. Vertical braces B and angle braces C hold the hull in fixed position and within the hull we then form our individual cells. As will be obvious as many cells may be used as desired, and in the drawings we are not showing any predetermined number of cells.

In Figure 1 of the drawings we have shown a vertical section of the hull and two cells with the center aisle or runway E through the entire hull for allowing the crew to pass therealong for repairs, communication, and other uses. The cells are shown as of metal, cell 1 having the entire area enclosed in a light weight but strong thin metal, or made of some like strength material which will have the strength to hold the pressure of the gas and air. These cells 1 are set opposite each other on each side of the ship within the hull A, and each cell is provided with a centrally mounted diaphragm 2 formed of some light weight, strong, flexible material, which will hold both air pressure and gas pressure. This diaphragm is adapted to be expanded into the upper portion of the cell hereafter known as the air chamber 3, or be contracted down into the lower portion of the cell hereinafter known as the gas chamber 4. The diaphragm divides the cells into the two chambers 3 and 4 and is adapted to be in expansion or contraction into either cell as the need may require for navigation of the aircraft. The air chamber 3 is provided with a fenestrated or perforated floor 5 thereacross, near the top end thereof running from wall to wall of the cell 1 to prevent the expansion of the gas from expanding the diaphragm too high and therefore shutting off the air vents and ports in the top of the cell. This perforated floor 5 has the ports 5a therein through which air may pass into the cell for contracting the diaphragm and therefore the gas in the chamber 4 or to allow the air to escape from the cell when the diaphragm is being expanded.

Through the top of each cell we provide an opening or port 6 to which a pipe 7 is connected, the pipe 7 leading to a source of either air under pressure, or of suction or vacuum, so that the port 6 may be used to force air into the cell or draw air therefrom as desired. A worm like control member 8 is mounted in the pipe 7 adapted to rotate in either direction when the fan F is operating, either to force air into the chamber or draw it from the chamber, depending upon the circumstances and the requirements.

The fan F is operated by a motor 9 and the motor is controlled by a suitable switch control from the control room of the ship (not shown). Within the cell in the gas chamber 4 we provide an opening 10 through which a thermostat 11 is passed, with the setting of the thermostat provided from outside the cell but, with the expansion members within the cell, the thermostat to control the temperatures in the cell. This thermostat 11 is connected to the control room for hand control and is also connected with the blower and suction fan motor 9 to automatically operate the fan when so desired.

A heating element 15 is mounted in the bottom of each cell in the gas chamber 4, said element being preferably an electric element 16 with suitable insulation 17 therearound with wires to supply the electrical energy required for heating the element. These wires are also connected with the thermostat and also with the control room so that when the temperature in the cell drops lower than a predetermined setting of the thermostat the electrical energy will enter the element 16 and heat the gas and when the temperature of the gas raises to a predetermined number of degrees or fractions of a degree, the thermostat turns off the energy. Also as shown in Figure 4 of the drawings, the fenestrated or perforated floor 5 may be made of an outer shell 18 spaced apart by a space 19 with the ports 20 passing through the entire floor but, not being in open connection with the space 19, the space being suitably connected with a refrigerating element to introduce cold gas or air into the space 19 and cool the entire cell thereby, when the temperature has been raised too high by the rays of the sun or other sources of heat. The cooling space might also be connected to the outside if desired to let the cold air pass through the space to cool it off, without the use of exterior manufactured refrigeration. Also warm air may be forced into the space 19 if so desired.

Filling ports 4a controlled by valves 4b provide means of introducing the helium gas into the cell.

Each air chamber 3 is provided with a pressure blow-off valve 22 shown with a pipe 23 leading to the atmosphere, said blow off valve to operate when the pressure of air in the chamber 3 exceeds a predetermined set pressure in the valve and the blow off valve may be controlled electrically from the control room where necessary. Further, the blow off valve may be manually controlled or may be electrically controlled by a series hook up with the blower fan and with the thermostat or with the heating element.

As shown in Figure 3, a heater may be provided for the gas chamber 4 by forming an elongated envelope 25 to a feed pipe 26 and setting the envelope in the bottom of the gas cell chamber 4 to replace the electrical heating element and the feed pipe 26 may be connected with a source of hot air or hot gasses or with the exhaust pipes of the driving motors of the ship so that the hot gasses may be introduced thereinto as desired to heat the helium gas in the chamber 4.

In Figure 5 of the drawings we have shown two different types of cells the one on the left of the figure being shown is that of a gas cell 30 having an expansible air bag 31 carried therein, said bag adapted to be expanded by air pressure provided by the pipe 32 and blower 33 and this bag 31 being used to compress the gas or allow it to expand as desired. When the gas is to be compressed the air is forced into the bag 31 until it has expanded to the desired degree and when the gas is to be expanded the air is drawn out of the bag.

As a heating means to expand the gas we have shown an annular heating element formed of an electrical element 34 and insulation 35 with suitable wires leading to a source of electrical energy. This type of device eliminates many parts of the other types shown but might be harder to navigate and control. Also in Figure 5 on the left hand side of the figure the device is shown as a mechanically controlled diaphragm 37 in a cell 38 with the diaphragm mounted medially of the sides of the cell and with the top chamber 39 above the diaphragm called the air chamber and the bottom chamber 40 under the diaphragm called the helium gas chamber. In this figure the heater envelope 25 shown in Figure 3 is shown installed for heating the gas. This may also be used to introduce cold into the gas chamber to reduce the gas pressure if so desired.

The diaphragm 37 is provided with a centrally located floor or plate 41 secured to the diaphragm and on this plate we provide a drum 42 supported by bearings 43 and actuated by a motor 44 which motor has the electrical wires W wound on a small drum 45 on the same shaft 46 as that on which the drum 42 is mounted. Thus, the motor may be operated to wind the cable 47 onto the drum 42. Above the top of the cell there is a drum 49 like the drum 42 mounted on a shaft 48 and the shaft 48 is driven by a motor 50 and train of gears 51. The wire W is wound and unwound from a drum 52 on the shaft 48 thus, when the cable is wound onto the drum the wire is also wound onto the drum. When the gas is to be compressed the drum 49 is released to unwind and the drum 42 is started to wind and as the weight of the cable from the drum 49 is transferred to the drum 42 the weight forces the plate 41 down and the gas is compressed. The speed of the drum must be such that the cable may be wound onto the drum 42 as the plate lowers and at the same time it is unwound from the drum 49 to allow the plate to lower and the drum 42 to assume this greater weight.

In Figure 6 the cell of the device is shown as a double walled cell 54 with an outer wall 55 and an inner wall 56 spaced apart by dead air space 57. This space 57 may be filled with suitable insulation or may be used as a refrigerating or heating chamber if so desired, but it primarily is to keep the heat of the sun or cold of the atmosphere from affecting the gas in the cell. A flexible diaphragm 59 of the bellows type is mounted within the cell 54 and the gas when expanding will expand the bellows and when contracting will fold the bellows. This showing is merely to show an alternate type of forming the flexible diaphragm of our invention.

In Figure 7 we have shown a single cell 60 showing a modified manner of operating the diaphragm which consists of a plate 61 mounted onto the diaphragm 62 and with a cable 63 secured to the plate on the top side and a cable 64 secured to the plate on the bottom side extending down through the gas chamber 65 and with the upper cable 63 extending up through the air chamber 66. These two cables are to operate in opposed direction to each other and the cable 63 is wound onto a drum 68 by a motor 69 and the cable 64 is wound onto a drum 70 by a motor 71. These two motors are to be wired to allow one drum to unwind while the other drum is winding and the reverse so that the plate and therefore the diaphragm may be raised or lowered by the cables to control the expansion and contraction of the gas. Thus a positive compression may be made of the gas when the lower cable is wound and the upper cable unwound and a positive expansion may be provided when the upper cable is wound and the lower cable unwound.

Applicants have not gone into detail of wiring and electrical systems for their invention as the many different systems used will any one of them control the different parts of this invention and applicants do not wish to limit themselves to any specific wiring diagrams.

Modifications and changes in the different details of construction and machine elements do not depart from the spirit of the invention or from the scope of the claims.

As a modified form of making the device shown in Figure 8, applicants wish to point out that a double diaphragm may be used in each cell dividing the cell into three chambers with the central chamber holding either the air or the helium gas and with the two end chambers holding either the air or gas so that a further method of controlling the expansion and contraction of the helium gas may be utilized if desired.

In Figure 8 of the drawings we have shown two cells K and L, the cell K being provided with two opposed diaphragms 75 and 76 identical in form to the diaphragm 2 of Figure 1 but each diaphragm is mounted near the ends of the cell and the chamber 77 between the diaphragm is filled with the lifting gas and the chambers 78 and 79 at each end of the cell are filled or controlled by air being forced thereinto by a pump P. Air inlet supply pipes 80 and 81 lead from the pump to these chambers and each chamber is provided with a discharge pipe 82 and control valve 83. Lifting gas is introduced into the chamber 77 through the pipe 84 controlled by the valve 85. In the cell L, the like opposed diaphragms 75 and 76 are mounted in identical places, but the lifting gas is introduced into the chambers 78 and 79 through lead in control valves 86 and 87 which may be control valves of short length or may be made longer if desired. The air is introduced into the central chamber 77 through the pipe 88 leading directly from the pump P and a discharge pipe and valve 89 controls the air in the chamber 77. The only difference in these views is the place of using the lifting gas whether in the central chamber 77 or in the end chambers 78 and 79.

Having thus described our invention we desire to secure by Letters Patent and claim:

1. In a lighter than air craft, the combination of a frame work having suitable covering thereover; individual cells formed in said frame work; a flexible rolling diaphragm mounted medially of each cell to roll down into the lower portion of the cell when the gas pressure is low and roll up into the upper portion of the cell when the pressure is high; means to introduce air pressure into the cell above the diaphragm; means to introduce gas into the cell below the diaphragm; a heating element in said gas portion; a partition across the top of the cell near the top end thereof having openings therethrough to prevent the diaphragm expanding against the top of said cell and locking the air pressure from entering thereinto; and means to introduce cold air into said cell above said partition to cool said cell and the gas under the diaphragm.

2. In a lighter than air craft, the combination of a frame work having suitable covering thereover; individual cells formed in said frame work; flexible rolling diaphragms mounted near each end of each cell to roll up or down into the upper or lower portions of said cell when the pressure of gas and air is varied; means to introduce gas pressure into the space between said diaphragms; and means to introduce air pressure into the space at each end of said cell to control the gas pressure by the pressure of the air on said diaphragms.

3. In a lighter than air craft, the combination of a framework having a suitable covering thereover; individual cells formed in said framework; a flexible rolling diaphragm means mounted in each cell to roll toward one portion of the cell when the gas pressure is low in that portion and to roll toward another portion of the cell when the pressure is high; means to introduce air under pressure to one side of the diaphragm; means to introduce gas to the other side of said diaphragm; a partition across the top of the cell near the top end thereof having openings therethru to prevent the diaphragm expanding against the top wall of said cell and locking the air pressure from entering thereinto; and means to introduce cold air into said cell above said partition to cool said cell and the gas under the diaphragm.

HUGO G. REICHERT.
LUDWIG H. O. STOBBE.